United States Patent
Karnati et al.

(10) Patent No.: US 12,342,419 B2
(45) Date of Patent: Jun. 24, 2025

(54) CONNECTION CONFIGURATION FOR FOURTH GENERATION (4G) AND FIFTH GENERATION (5G) CONVERGED DEPLOYMENT

(71) Applicant: Cisco Technology, Inc., San Jose, CA (US)

(72) Inventors: Omkara Srinivas Rao Karnati, Singapore (SG); Ravi Shekhar, Pune (IN); Seung Cheol Park, Seoul (KR); Rajaneesh Shetty, Bangalore (IN); Niranjan Mallapura Mallikarjunaiah, Bangalore (IN)

(73) Assignee: Cisco Technology, Inc.

( * ) Notice: Subject to any disclaimer, the term of this patent is extended or adjusted under 35 U.S.C. 154(b) by 506 days.

(21) Appl. No.: 17/819,696

(22) Filed: Aug. 15, 2022

(65) Prior Publication Data

US 2024/0056789 A1    Feb. 15, 2024

(51) Int. Cl.
  *H04W 8/18* (2009.01)
  *H04W 48/18* (2009.01)
  *H04W 76/10* (2018.01)

(52) U.S. Cl.
  CPC .............. *H04W 8/18* (2013.01); *H04W 48/18* (2013.01); *H04W 76/10* (2018.02)

(58) Field of Classification Search
  CPC ........... H04W 8/24; H04W 8/18; H04W 8/20; H04W 8/183; H04W 8/186; H04W 76/25; H04W 76/10; H04W 76/15; H04W 48/16; H04W 48/18
  See application file for complete search history.

(56) References Cited

U.S. PATENT DOCUMENTS

| | | | |
|---|---|---|---|
| 12,232,023 B2* | 2/2025 | Gundavelli | H04W 12/06 |
| 2017/0105150 A1* | 4/2017 | Olsson | H04W 36/0058 |
| 2019/0261233 A1 | 8/2019 | Duan et al. | |
| 2020/0245127 A1* | 7/2020 | Zong | H04W 36/0066 |
| 2021/0258836 A1 | 8/2021 | Faccin et al. | |
| 2021/0337611 A1 | 10/2021 | Dodd-Noble et al. | |
| 2021/0352575 A1 | 11/2021 | Chun | |
| 2022/0191766 A1* | 6/2022 | Li | H04W 8/22 |
| 2022/0248208 A1* | 8/2022 | Nayak | H04L 65/1104 |
| 2022/0295355 A1* | 9/2022 | Xin | H04W 36/0033 |
| 2023/0156832 A1* | 5/2023 | Jeong | H04W 8/22 455/422.1 |
| 2024/0236670 A1* | 7/2024 | Allan | H04W 12/75 |

OTHER PUBLICATIONS

Niranjan M M, "Method to Improve Quality of Experience to 5G Users in Multi-Slice Network Deployments" https://www.tdcommons.org/dpubs_series, Mar. 2022, 10 pages.

* cited by examiner

*Primary Examiner* — Allahyar Kasraian
(74) *Attorney, Agent, or Firm* — Merchant & Gould P.C.

(57) ABSTRACT

Connection configuration for Fourth Generation (4G) and Fifth Generation (5G) converged deployment may be provided. A User Equipment (UE) Usage Type (UUT) mapping may be stored, wherein the UUT mapping includes an Attribute Value Pair (AVP) for one or more UUTs. A connection to a 5G network from a 4G network may be received from a UE, wherein the connection comprises subscription information that includes a UUT the UE is subscribed to. In response to receiving the UUT, a subscriber profile for the UE in a converged packet core may be determined using the UUT mapping, and the configuration of the connection for the UE may be established based on the determined subscriber profile.

20 Claims, 6 Drawing Sheets

| UUT | Network Classification | S-NSSAI | Subscriber Profile | Subscription | DNN | Slice Type | Priority |
|---|---|---|---|---|---|---|---|
| 150 | NSA | [SST-1, SD=500] | Gold - eMBB | Subscribed | 5G | Default | 2 |
| 151 | NSA | [SST-1, SD=600] | Sliver - eMBB | Not-Subscribed | 5G | Non-Default | 3 |
| 152 | SA | [SST-1, SD=700] | Bronze - eMBB | Not-Subscribed | 5G | Non-Default | 4 |
| 153 | SA | [SST-1, SD=800] | Gold - URLLC | Subscribed | 5G | Non-Default | 1 |

FIG. 3

CONNECTION CONFIGURATION FOR FOURTH GENERATION (4G) AND FIFTH GENERATION (5G) CONVERGED DEPLOYMENT

TECHNICAL FIELD

The present disclosure relates generally to providing connection configuration for Fourth Generation (4G) and Fifth Generation (5G) converged deployment.

BACKGROUND

Networking architectures have grown increasingly complex in communications environments, particularly mobile networking environments. Mobile communication networks have grown substantially in subscriber base as end users become increasingly connected to mobile network environments. As the number of mobile subscribers increases, efficient management of communication resources becomes more critical. In particular, there are significant challenges related to providing 3rd Generation Partnership Project (3GPP) accesses efficiently.

An example mobile communication network may comprise a Fifth Generation (5G) network. 5G networks are cellular networks, in which the service area is divided into small geographical areas called cells. 5G wireless devices in a cell communicate by radio waves with a cellular base station via fixed antennas, over frequency channels assigned by the base station. The base stations, termed gNodeBs (gNB), are connected to switching centers in the telephone network and routers for Internet access by high-bandwidth optical fiber or wireless backhaul connections. As in other cellular networks, a mobile device moving from one cell to another is automatically handed off seamlessly to the current cell. 5G may support up to a million devices per square kilometer, for example, while Fourth Generation (4G) may support only one-tenth of that capacity.

BRIEF DESCRIPTION OF THE FIGURES

The accompanying drawings, which are incorporated in and constitute a part of this disclosure, illustrate various embodiments of the present disclosure. In the drawings:

FIG. 3 is a diagram of a mapping table for providing connection configuration for 4G and 5G converged deployment;

DETAILED DESCRIPTION

Overview

Figure 1:
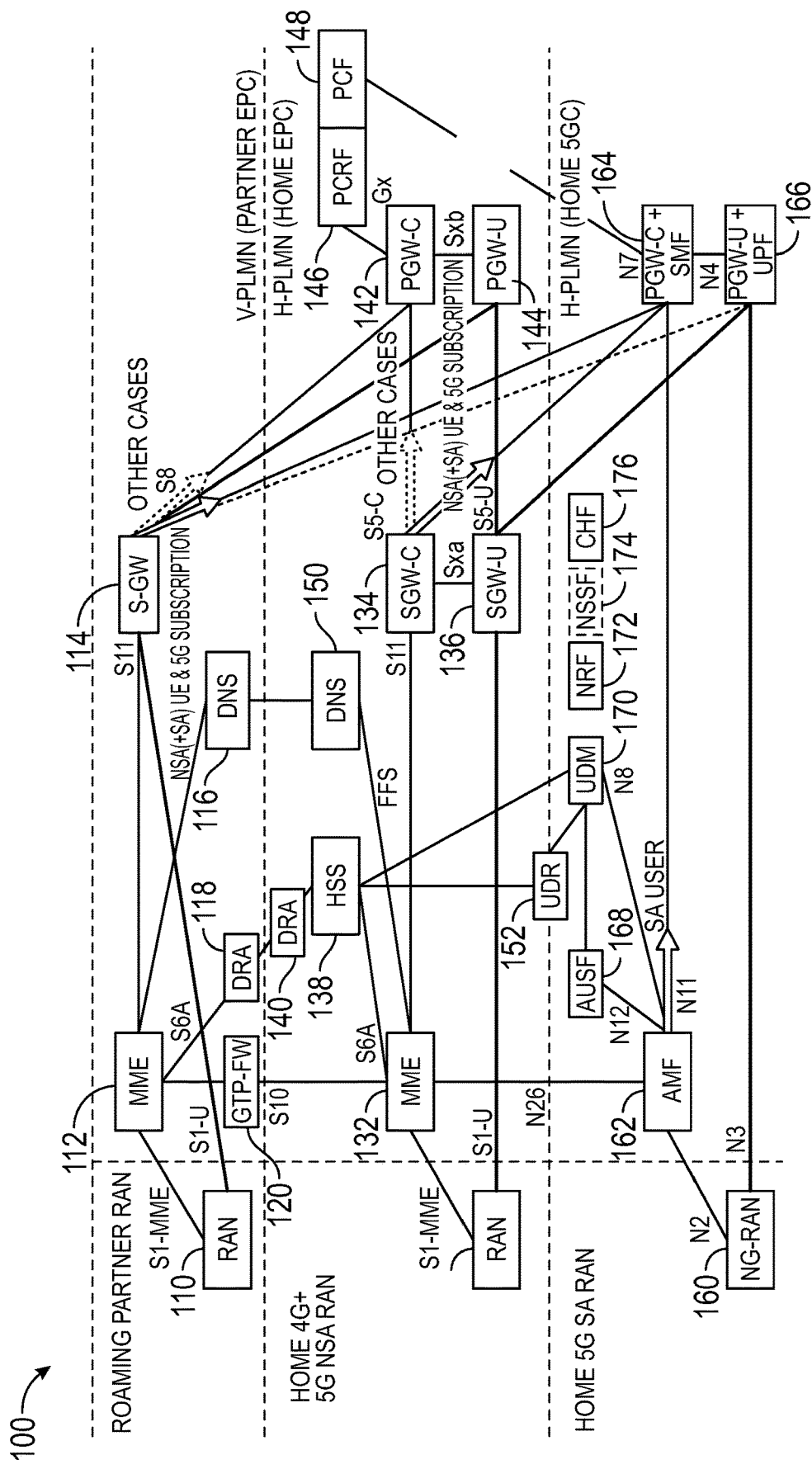
FIG. 1 is a block diagram of an operating environment for providing connection configuration for Fourth Generation (4G) and Fifth Generation (5G) converged deployment.

Connection configuration for Fourth Generation (4G) and Fifth Generation (5G) converged deployment may be provided. A User Equipment (UE) Usage Type (UUT) mapping may be stored, wherein the UUT mapping includes an Attribute Value Pair (AVP) for one or more UUTs. A connection to a 5G network from a 4G network may be received from a UE, wherein the connection comprises subscription information that includes a UUT the UE is subscribed to. In response to receiving the UUT, a subscriber profile for the UE in a converged packet core may be determined using the UUT mapping, and the configuration of the connection for the UE may be established based on the determined subscriber profile.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

A converged network may handle Fourth Generation (4G) traffic and Fifth Generation (5G) traffic. However, 5G traffic may require using 4G functions for the network to operate correctly. Thus, the connection configuration, such as the correct network nodes, slices, network classifications, and the like, may need to be determined. The 3rd Generation Partnership Project (3GPP) defines indicators for selecting 5G features such as nodes, slices, and classifications. However, the 3GPP indicators may include many flags, and the best combination of flags may be difficult to determine for each use case. Additionally, use of the flags may cause failures when selecting a network slice, transitioning from the 4G network to the 5G network, and the like.

FIG. 1 is a block diagram of an operating environment 100 for providing connection configuration for Fourth Generation (4G) and Fifth Generation (5G) converged deployment. The environment 100 may include a roaming partner Radio Access Network (RAN) 110, and the roaming partner RAN 110 may be associated with a Mobility Management Entity 112, a Serving Gateway 114, a Domain Name System (DNS) 116, a Diameter Routing Agent (DRA) 118, and a General Packet Radio Service Tunneling Protocol firewall (GTP-FW) 120. The environment 100 may also include a home 4G and 5G Non-Standalone Access (NSA) RAN 130, and the home 4G and 5G NSA RAN 130 may be associated with an MME 132, a SGW Control plane function (SGW-C) 134, a SGW User plane function 136, a Home Subscriber Server (HSS) 138, a DRA 140, a Packet Data Network Gateway (PGW) Control plane function (PGW-C) 142, a PGW User plane function (PGW-U) 144, a Policy and Charging Rules Function (PCRF) 146, a Policy Control Function (PCF) 148, a DNS 150, and the UDR 152. The environment 100 may also include a home 5G Standalone Access (SA) RAN 160. The 5G SA RAN 160 may be a Next Generation RAN (NG-RAN). The 5G SA RAN 160 may be associated with the UDR 152, an Access and Mobility Management Function (AMF) 162, a PGW-C and Session Management Function (SMF) 164, a PGW-U and User Plane Function (UPF) 166, an Authentication Server Function (AUSF) 168, a Unified Data Management (UDM) 170, a Network Repository Function 172, a Network Slice Selection Function 174, and a Charging Function (CHF) 176.

UE usage type (UUT) attribute value pairs (AVP) may be configured in the UDR 152 and/or the UDM 170 as part of the UE subscription information. A network operator may provision the AVPs of the UUTs in the UDR 152 and/or the UDM 170. The MME 132 may store and maintain a mapping to access information associated with the UUT AVPs. The mapping may be a table that includes the UUT AVP, a UE subscriber profile, and other data associated with the UUT AVPs. The mapping may include data for multiple UUTs.

The mapping may include, for each UUT AVP, a subscriber profile, a network classification, a Single-Network Slice Selection Assistance Information (S-NSSAI), a subscription, a Data Network Name (DNN), a slice type, a priority, and the like. The MME 132 may receive the data associated with the UUT AVPs, including the subscriber profile, the network classification, S-NSSAI, the subscription, the DNN, the slice type, and the priority, from the HSS 138. The MME 132 may then store the mapping of the UUT AVPs and the associated data. The UDR 152 and/or the UDM may instruct the MME 132 to update the UTT when needed. The mapping will be described in more detail herein with respect to FIG. 3.

When a UE attaches to the network, the UE may indicate which UUT(s) the UE is subscribed to. For example, the UUT(s) the UE is subscribed to may be included in the Attach request. In another example, the HSS 138 may send the MME 132 information identifying which UUT(s) the UE is subscribed to. In an additional example, the MME 132 may execute a DNS query, and the DNS reply may include the UUT(s) the UE is subscribed to. The DNS query may be in response to the UE attaching to the network. In another example, the MME 132 may receive a Unique Local Address (ULA) that includes the UUT(s) the UE is subscribed to.

The MME 132 may determine if the UE's session should be anchored on a legacy Evolved Packet Core (EPC) network (e.g., the PGW-C 142) or if the UE session can be anchored on a converged packet core network (e.g., the PGW-C and SMF 164) using UUT(s) the UE is subscribed to and the UUT mapping table to determine the AVPs and other information associated with the UE. For example, the MME 132 may use the UUT mapping table to determine if the network classification of the UE is NSA or SA capable. If the network classification is NSA capable, the MME 132 may determine to anchor the UE's session on the legacy EPC network. If the network classification is SA capable, the ME 132 may determine to anchor the UE's session to the converged packet core network.

The MME 132 may also use the UUT(s) the UE is subscribed to and the UUT mapping table to determine the slice ID. The MME 132 may use the slice ID for anchoring the UE on the converged packet core network when the UE is a dual mode UE connecting from a 4G network. Additionally, the MME 132 may use the UUT(s) the UE is subscribed to and the UUT mapping table to determine the slice for the UE session, the Gateway functions, network nodes, and the like.

When the converged packet core is used for anchoring both 4G and 5G sessions, the MME 132 may use the UUT(s) the UE is subscribed to and the UUT mapping table to determine whether the PCRF 146 or the PCF 148 should coordinate communications within the network for the UE's session. The MME 132 may also use the UUT(s) the UE is subscribed to and the UUT mapping table to determine the CHF node and the Online Charging System (OCS) node. The MME 132 may also use the UUT(s) the UE is subscribed to and the UUT mapping table to determine, for a given Packet Data Network (PDN) connection, which policies, Quality of Service rules, charging rules, and the like to apply.

Figure 2:
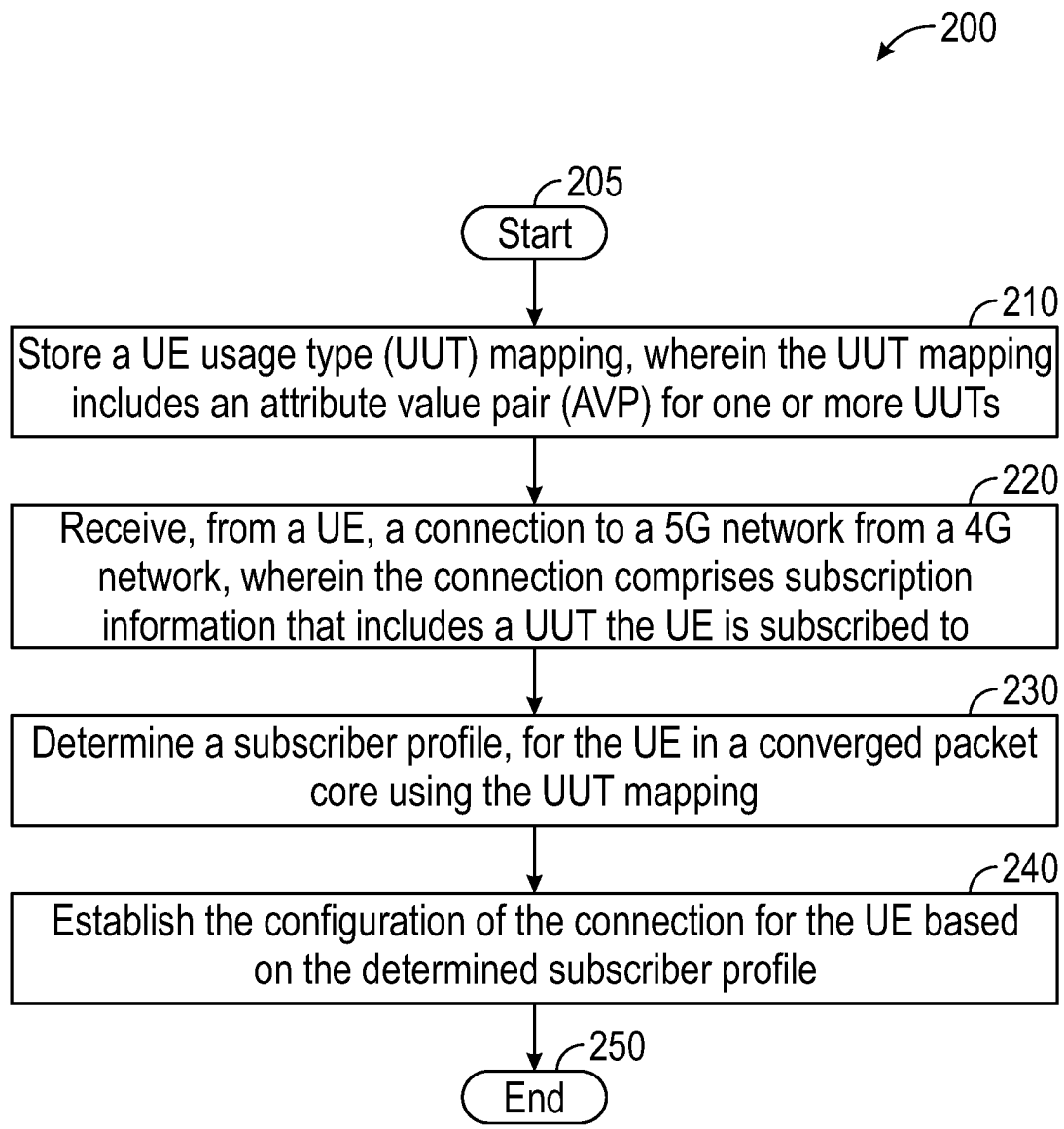
FIG. 2 is a flow chart of a method for providing connection configuration for 4G and 5G converged deployment.

FIG. 2 is a flow chart of a method 200 for providing connection configuration for 4G and 5G converged deployment. The method 200 may begin in starting block 205 and proceed to operation 210, where a UUT mapping is stored, wherein the UUT mapping includes one or more an Attribute Value Pair (AVP) for one or more UUTs. For example, the MME 132 may store the UUT mapping. The UUT mapping may be based on UUT AVPs configured by the UDM 170 and/or UDR 152.

In operation 220, a connection to a 5G network from a 4G network is received from a UE, wherein the connection comprises subscription information that includes a UUT the UE is subscribed to. For example, the home 4G and 5G NSA RAN 130 may receive the connection from the UE. The connection may indicate that the UE is 5G capable. The MME 132 may receive the subscription information that includes a UUT the UE is subscribed to.

In operation 230, a subscriber profile for the UE in a converged packet core is determined using the UUT mapping. For example, the MME 132 may use the UUT the UE is subscribed to and the UUT mapping to determine the subscriber profile associated with the UE. In operation 240, a configuration of the connection for the UE is established based on the determined subscriber profile. For example, the MME 132 may use the subscriber profile to determine the slice, whether to use the PCRF or the PCF, select an OCS node, select a CHF node, select policies, select QoS rules, select charging rules, network classification, node selection, and the like. The MME 132 may establish the configuration of the connection for the UE based on the determinations.

FIG. 3 is a diagram of a UUT mapping table 300 for providing connection configuration for 4G and 5G converged deployment. The UUT mapping table 300 may comprise attributes including a UUT 302, a network classification 304, an S-NSSAI, a subscriber profile 310, a subscription 312, a slice type 314, and a priority 316. The UUT mapping table 300 may include four sets of AVPs associated with a set 320 with the UUT 302 AVP value of 150, a set 330 with the UUT 302 AVP value of 151, a set 340 with the UUT 302 AVP value of 152, and a set 350 with the UUT 302 AVP value of 153.

An MME, such as MME 132, may use the sets stored in the UUT mapping table to determine the slice, whether to use the PCRF or the PCF, select an OCS node, select a CHF node, select policies, select QoS rules, select charging rules, network classification, node selection, and the like for a UE. For example, the MME 132 may determine that a subscriber associated with a UE is subscribed to UUT 150 and UUT 153. Thus, the MME 132 may use the AVPs in the set 320 and the AVPs in the set 350 to determine the slice, whether to use the PCRF or the PCF, select an OCS node, select a CHF node, select policies, select QoS rules, select charging rules, network classification, node selection, and the like.

Figure 4:
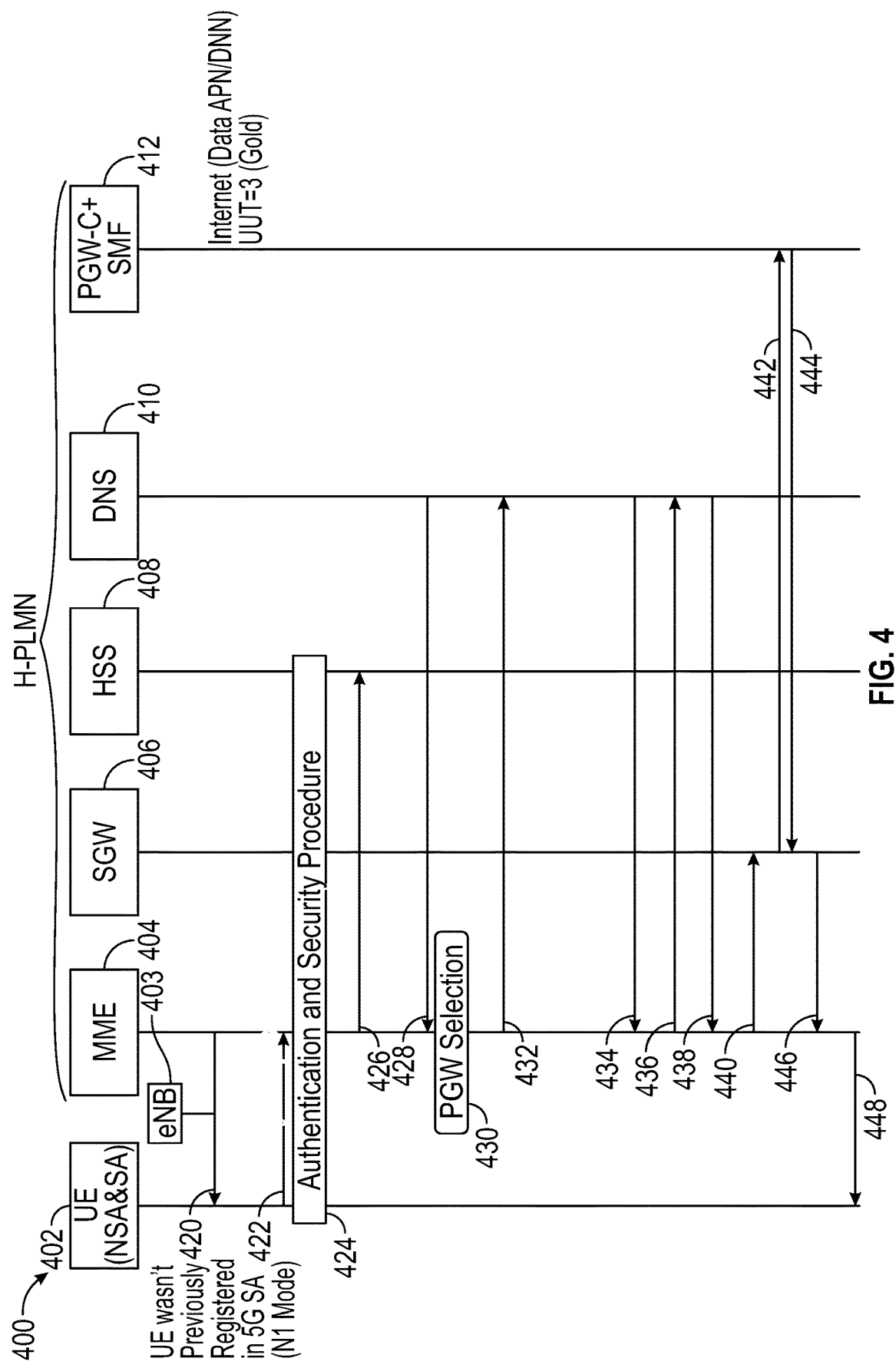
FIG. 4 is a signaling process for an Evolved Packet Core (EPC) attach procedure for a User Equipment (UE) that is 5G Non-Standalone Access (NSA) and Standalone Access (SA) capable.

FIG. 4 is a signaling process 400 for an EPC attach procedure for a UE 402 that is 5G NSA and SA capable. The signaling process may be between the UE 402, an eNodeB (eNB) 403, an MME 404, a SGW 406, an HSS 408, a DNS 410, and a PGW-C and SMF 412. The signaling process 400 may begin with signal 420. In signal 420, the eNB 403 may indicate to the UE 402 that the UE 402 can connect to a 5G network.

In signal 422, the UE 402 may send an Attach request to the MME 404. The attach request may indicate that the UE 402 supports Dual-Connectivity with New Radio (DCNR), and that the UE 402 is 5G SA capable. In operation 424, the UE 402, the MME 404, the SGW 406, and the HSS 408 may perform an authentication and security procedure. In signal 426, the MME 404 may send an Update Location Request (ULR) to the HSS 408. The ULR may indicate that the New Radio (NR) is a secondary Radio Access Technology (RAT).

In signal 428, the HSS 408 may send a ULR response to the MME 404. The ULR response may include UUTs associated with the UE 402 and an indicator of whether the UE is subscribed to 5G services. In operation 430, the MME 404 may determine to anchor the UE's session on the legacy EPC network or to anchor the UE's session to the converged packet core network. In signal 432, the MME 404 may send a DNS query to the DNS 410. In signal 434, the DNS 410 may send a DNS response to the MME 404.

In operation 436, the MME 404 may send a DNS request for a URL to the DNS 410. In operation 438, the DNS 410 may send a DNS request with the URL to the MME 404. In signal 440, the MME 404 may send a create session request to the SGW 406. The create session request may include a UPF selection indication set to DCNR and a PGW address indication set to the URL. The SGW 406 may send the create session request to the PGW-C and SMF in signal 442. The PGW-C and SMF 412 may send a create session response to the SGW 406 in signal 444, and the SGW 406 may send the create session response to the MME 404 in signal 446. In signal 448, the MME 404 may send an Attach accept to the UE 402.

Figure 5:
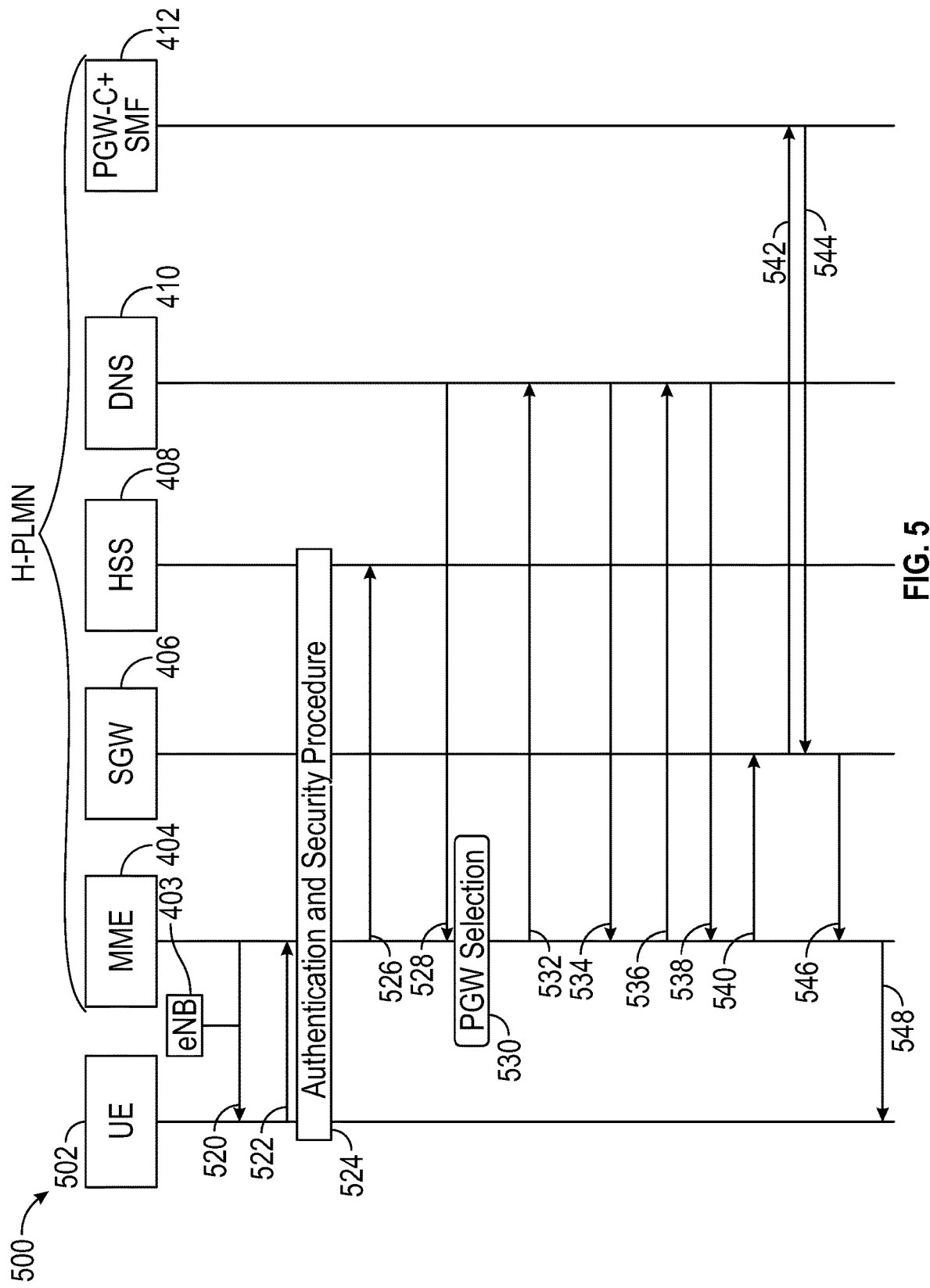
FIG. 5 is a signaling process for an EPC attach procedure for a UE that is not 5G NSA or SA capable.

FIG. 5 is a signaling process 500 for an EPC attach procedure for a UE 502 that is not 5G NSA or SA capable. The signaling process may be between the UE 502, the eNB 403, the MME 404, the SGW 406, the HSS 408, the DNS 410, and the PGW-C and SMF 412. The signaling process 500 may begin with signal 520. In signal 420, the eNB 403 may indicate to the UE 502 that the UE 502 can connect to a 5G network.

In signal 522, the UE 502 may send an Attach request to the MME 404. The attach request may indicate that the UE 502 does not support Dual-Connectivity with New Radio (DCNR) and that the UE 502 is not 5G SA capable. In operation 524, the UE 502, the MME 404, the SGW 406, and the HSS 408 may perform an authentication and security procedure. In signal 526, the MME 404 may send an Update Location Request (ULR) to the HSS 408. The ULR may indicate that the New Radio (NR) is a secondary Radio Access Technology (RAT).

In signal 528, the HSS 408 may send a ULR response to the MME 404. The ULR response may include UUTs associated with the UE 402 and an indicator of whether the UE is subscribed to 5G services. In operation 530, the MME 404 may determine to anchor the UE's session on the legacy EPC network or to anchor the UE's 502 session to the converged packet core network. In signal 532, the MME 404 may send a DNS query to the DNS 410. In signal 534, the DNS 410 may send a DNS response to the MME 404.

In operation 536, the MME 404 may send a DNS request for a URL to the DNS 410. In operation 538, the DNS 410 may send a DNS request with the URL to the MME 404. In signal 540, the MME 404 may send a create session request to the SGW 406. The create session request may include a UPF selection indication set to DCNR and a PGW address indication set to the URL. The SGW 406 may send the create session request to the PGW-C and SMF in signal 542. The PGW-C and SMF 412 may send a create session response to the SGW 406 in signal 544, and the SGW 406 may send the create session response to the MME 404 in signal 546. In signal 548, the MME 404 may send an Attach accept to the UE 402.

Figure 6:
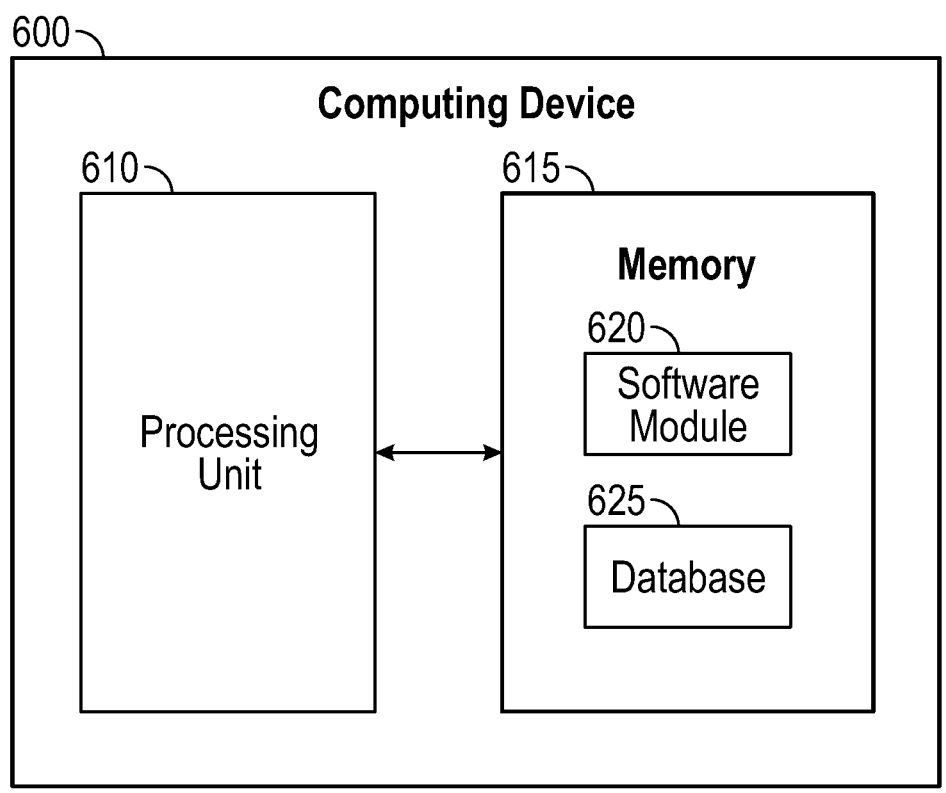
FIG. 6 is a block diagram of a computing device.

FIG. 6 is a block diagram of a computing device. As shown in FIG. 6, computing device 600 may include a processing unit 610 and a memory unit 615. Memory unit 615 may include a software module 620 and a database 625. While executing on processing unit 610, software module 620 may perform, for example, processes for providing connection configuration for 4G and 5G converged deployment as described above with respect to FIG. 1, FIG. 2, FIG. 3, FIG. 4, and FIG. 5. Computing device 600, for example, may provide an operating environment for the RAN 110, the MME 112, the SGW 114, the DNS 116, the DRA 118, the GTP-FW 120, the 4G and 5G NSA RAN 130, the MME 132, the SGW-C 134, the SGW-U 136, the HSS 138, the DRA 140, the PGW-C 142, the PGW-U 144, the PCRF 146, the PCF 148, the DNS 150, the UDR 152, the 5G SA RAN 160, the AMF 162, the PGW-C and SMF 164, the PGW-U and UPF 166, the AUSF 168, the UDM 170, the NRF 172, the NSSF 174, the CHF 176, the UE 402, the eNB 403, the MME 404, the SGW 406, the HSS 408, the DNS 410, the PGW-C and SMF 412, the UE 502, and/or any other system described herein. The RAN 110, the MME 112, the SGW 114, the DNS 116, the DRA 118, the GTP-FW 120, the 4G and 5G NSA RAN 130, the MME 132, the SGW-C 134, the SGW-U 136, the HSS 138, the DRA 140, the PGW-C 142, the PGW-U 144, the PCRF 146, the PCF 148, the DNS 150, the UDR 152, the 5G SA RAN 160, the AMF 162, the PGW-C and SMF 164, the PGW-U and UPF 166, the AUSF 168, the UDM 170, the NRF 172, the NSSF 174, the CHF 176, the UE 402, the eNB 403, the MME 404, the SGW 406, the HSS 408, the DNS 410, the PGW-C and SMF 412, the UE 502, and/or any other system described herein may operate in other environments and are not limited to computing device 600.

Computing device 600 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 600 may comprise any computer operating environment, such as hand-held devices, multiprocessor systems, microprocessor-based or programmable sender electronic devices, minicomputers, mainframe computers, and the like. Computing device 600 may also be practiced in distributed computing environments where tasks are performed by remote processing devices. The aforementioned systems and devices are examples, and computing device 600 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 600 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
   storing a User Equipment (UE) Usage Type (UUT) mapping, wherein the UUT mapping includes an Attribute Value Pair (AVP) for one or more UUTs;
   receiving, from a UE, a connection to a 5G network from a 4G network, wherein the connection comprises subscription information that includes a UUT the UE is subscribed to;
   in response to receiving the UUT, determining a subscriber profile for the UE in a converged packet core using the UUT mapping; and
   establishing the configuration of the connection for the UE based on the determined subscriber profile.

2. The method of claim 1, wherein establishing the configuration of the connection for the UE comprises selecting a network slice.

3. The method of claim 1, wherein establishing the configuration of the connection for the UE comprises selecting a PCRF or a PCF to coordinate communications within the network for the UE.

4. The method of claim 1, wherein establishing the configuration of the connection for the UE comprises selecting an Online Charging System (OCS) node and a Charging Function (CHF) node.

5. The method of claim 1, wherein establishing the configuration of the connection for the UE comprises applying any of (i) a policy, (ii) a Quality of Service (QoS) rule, (iii) a charging rule, and (iv) any combination of (i)-(iii).

6. The method of claim 1, wherein the UUT mapping comprises attributes including any of (i) a network classification, (ii) a Single-Network Slice Selection Assistance Information (S-NSSAI), (iii) a subscriber profile, (iv) a subscription, (v) a slice type, (vi) a priority, and (vii) any combination of (i)-(vi).

7. The method of claim 1, wherein the UUT mapping comprises a priority attribute, and wherein determining the subscriber profile is based on the priority attribute.

8. A system comprising:
   a memory storage; and
   a processing unit coupled to the memory storage, wherein the processing unit is operative to:

store a User Equipment (UE) Usage Type (UUT) mapping, wherein the UUT mapping includes an Attribute Value Pair (AVP) for one or more UUTs;

receive, from a UE, a connection to a 5G network from a 4G network, wherein the connection comprises subscription information that includes a UUT the UE is subscribed to;

in response to receiving the UUT, determine a subscriber profile for the UE in a converged packet core using the UUT mapping; and establish the configuration of the connection for the UE based on the determined subscriber profile.

9. The system of claim 8, wherein to establish the configuration of the connection for the UE comprises to select a network slice.

10. The system of claim 8, wherein to establish the configuration of the connection for the UE comprises to select a PCRF or a PCF to coordinate communications within the network for the UE.

11. The system of claim 8, wherein to establish the configuration of the connection for the UE comprise to select an Online Charging System (OCS) node and a Charging Function (CHF) node.

12. The system of claim 8, wherein to establish the configuration of the connection for the UE comprises to apply any of (i) a policy, (ii) a Quality of Service (QoS) rule, (iii) a charging rule, and (iv) any combination of (i)-(iii).

13. The system of claim 8, wherein the UUT mapping comprises attributes including any of (i) a network classification, (ii) a Single-Network Slice Selection Assistance Information (S-NSSAI), (iii) a subscriber profile, (iv) a subscription, (v) a slice type, (vi) a priority, and (vii) any combination of (i)-(vi).

14. A non-transitory computer-readable medium that stores a set of instructions which when executed perform a method executed by the set of instructions comprising:

storing a User Equipment (UE) Usage Type (UUT) mapping, wherein the UUT mapping includes an Attribute Value Pair (AVP) for one or more UUTs;

receiving, from a UE, a connection to a 5G network from a 4G network, wherein the connection comprises subscription information that includes a UUT the UE is subscribed to;

in response to receiving the UUT, determining a subscriber profile for the UE in a converged packet core using the UUT mapping; and establishing the configuration of the connection for the UE based on the determined subscriber profile.

15. The non-transitory computer-readable medium of claim 14, wherein establishing the configuration of the connection for the UE comprises selecting a network slice.

16. The non-transitory computer-readable medium of claim 14, wherein establishing the configuration of the connection for the UE comprises selecting a PCRF or a PCF to coordinate communications within the network for the UE.

17. The non-transitory computer-readable medium of claim 14, wherein establishing the configuration of the connection for the UE comprises selecting an Online Charging System (OCS) node and a Charging Function (CHF) node.

18. The non-transitory computer-readable medium of claim 14, wherein establishing the configuration of the connection for the UE comprises applying any of (i) a policy, (ii) a Quality of Service (QoS) rule, (iii) a charging rule, and (iv) any combination of (i)-(iii).

19. The non-transitory computer-readable medium of claim 14, wherein the UUT mapping comprises attributes including any of (i) a network classification, (ii) a Single-Network Slice Selection Assistance Information (S-NSSAI), (iii) a subscriber profile, (iv) a subscription, (v) a slice type, (vi) a priority, and (vii) any combination of (i)-(vi).

20. The non-transitory computer-readable medium of claim 14, wherein the UUT mapping comprises a priority attribute, and wherein determining the subscriber profile is based on the priority attribute.

* * * * *